Patented Jan. 13, 1931

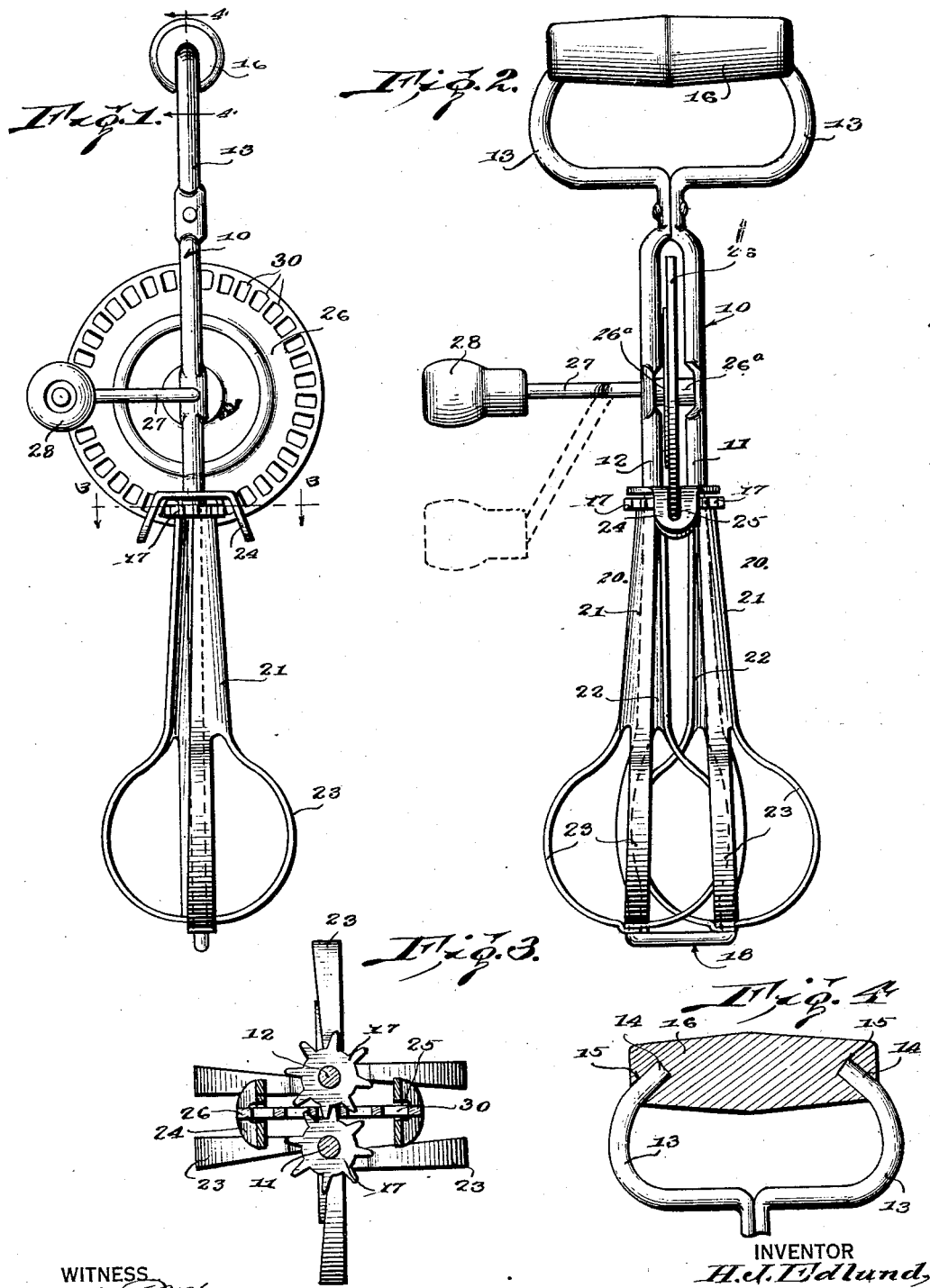

1,789,224

UNITED STATES PATENT OFFICE

HENRY J. EDLUND, OF BURLINGTON, VERMONT

EGG BEATER

Application filed November 18, 1929. Serial No. 408,017.

This invention relates to improvements in egg beaters.

More particularly the invention relates to improvements in the conventional form of egg beaters such as comprise a frame provided with a handle at one end and carrying a plurality of revolving beater blades which are driven by one or more hand operated wheels supported by the frame and cooperative pinions carried by the beater blades.

An object of the present invention is to provide an improved form of drive-wheel and gear construction.

It is also within the scope of the objects of the invention to provide beater blades that may be easily cleaned and maintained in a sanitary condition; and to provide a handle which is easy to grip and permit the beater to be held rigidly without great effort on the part of the operator.

The invention is illustrated by way of example in the accompanying drawings, in which:

Figure 1 is an elevation of a beater incorporating my improvements and when looking at one side of the drive-wheel, Figure 2 is a view similar to Figure 1 but when looking at an edge of the drive-wheel, Figure 3 is a detail sectional view taken on the line 3—3 of Figure 1 illustrating my improved drive-wheel and gear construction, and Figure 4 is a detail view illustrating my improved handle structure, and manner of attaching same.

Referring to the drawings more particularly, 10 indicates generally a main supporting frame for the beaters and operating means therefor. The frame 10 comprises the two spaced apart rods or legs 11 and 12, the upper portions of which are secured together as by a rivet as shown, and then extended outwardly and bent toward each other to form handle retaining means such as portions 13 terminating in inwardly disposed fingers 14. The frame 10 should be of such material that the extensions 13 are more or less resilient and capable of being spread apart to permit the fingers 14 thereof to engage in angularly disposed openings 15 provided in the ends of a handle 16. The handle 16 may be made of wood and preferably of the shape shown. The openings 15 should tightly accommodate the ends 14; and each end of the handle has its outer end formed to receive and seat the associated wire extension 13 and thereby hold the handle against rotation.

The lower ends of the frame rods 11 and 12 terminate in spaced apart relation and receive the upper ends of the leg portions of a substantially U-shaped beater blade supporting frame section 18. This frame section supports for rotary movement the beaters 20. Each beater comprises a conical-like tubular stock 21 provided with longitudinal openings 22 for a purpose which will later appear. The lower end of each member 21 terminates in four blades 23 which are bent and arranged to rotate in the conventional manner as shown. It should be noted that the lower or free ends of the blades of each beater may be secured together by a hollow rivet, and said rivet serving to journal the blades on the associated leg of the frame section 18.

The lower ends of the main frame members 11 and 12 are held rigid by an anchor plate 24 which preferably has its ends turned obliquely downwardly as shown and this anchor plate is provided with a longitudinal slot 25 adapted to accommodate a drive wheel 26. The drive wheel 26 is journaled between the main frame rods 11 and 12 by means of integral hubs 26ª on opposite sides of the wheel, one of said hubs being extended at its one end through the frame to form a crank arm 27 which has turnably secured at its end a suitable handle or knob 28.

The drive wheel 26 may be stamped from suitable sheet metal, and is provided, adjacent its outer periphery, with a multiplicity of equally spaced openings 30 substantially square in shape as shown and forming a circumferential row.

As illustrated to an advantage in Figure 3, the pinions 17 are adapted to mesh with each other and each opening 30 is adapted for receiving, simultaneously, companion meshing teeth of the gears or pinions 17. Assuming that the wheel 26 is rotated in a clock-wise direction, then it is apparent, as from Figure 3, that the rear edge of the opening receiving the meshing teeth of pinions 17 will engage one of said teeth and exert pressure for rotating the pinions and their associated beaters 21. This construction and arrangement of drive-wheel and gearing provides for quiet and efficient working of the beaters, and also enables expeditious and easy cleaning of the drive-wheel and pinions. Also, it should be noted that the recess 22 in the stock of each beater enables thorough and easy cleaning of the beaters so that the implement as a whole may be maintained in a sanitary condition.

Furthermore, it will be noted that the handle 16 when once placed in position affords a rigid grip by which the beater may be easily held during operation, and cannot turn in the hand. As all parts of the handle 16 are smooth and rounded there are no rough parts to injure the hand.

The ends 13 of the frame are bent at angle of approximately 45 degrees. By using this construction it will be seen that it will be impossible for the handle to become loose, which is also due to the fact that the handle is put in at the time that the frame members 11 and 12 are riveted together.

The upper ends of the beaters 21 carry the pinions 17 and are suitably journaled on the arms of the U-shaped beater supporting frame section 18, the upper ends of which are rigidly held in the lower ends of legs 11 and 12 of the frame 10.

What is claimed, is:—

1. In an egg beater construction, a beater comprising a hollow conical stock with a longitudinal recess, extending from its base to a point adjacent its other end and a plurality of blades extending from the base of the stock, said longitudinal slot permitting easy cleaning of the beater.

2. An egg beater comprising a main frame having members spaced apart and provided with a handle at their upper ends, a U-shaped frame secured to the lower ends of said members, a pair of beaters mounted in the U-shaped frame, said beaters having conical tubular shanks provided with longitudinal slots, pinions on the shanks of the beaters and meshing with each other and a drive wheel mounted between the members of the main frame and meshing with the pinion.

H. J. EDLUND.